United States Patent
Granier

(10) Patent No.: US 6,711,399 B1
(45) Date of Patent: Mar. 23, 2004

(54) DEVICE AND METHOD FOR EMERGENCY CALL

(75) Inventor: Emmanuel Granier, Puteaux (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/509,539

(22) PCT Filed: Oct. 12, 1998

(86) PCT No.: PCT/FR98/02183

§ 371 (c)(1),
(2), (4) Date: Sep. 18, 2000

(87) PCT Pub. No.: WO99/19177

PCT Pub. Date: Apr. 22, 1999

(30) Foreign Application Priority Data

Oct. 10, 1997 (FR) ............................................ 97 12702

(51) Int. Cl.⁷ .............................................. H04M 11/04
(52) U.S. Cl. ................................ 455/404.1; 455/414.1; 455/456.1; 455/521; 379/45; 379/51; 340/426.16; 340/436
(58) Field of Search .......................... 455/404.1, 404.2, 455/403, 456.1, 521, 414.1; 379/45, 51; 370/316; 340/425.5, 426.16, 436; 342/357, 357.12

(56) References Cited

U.S. PATENT DOCUMENTS

| | | | | |
|---|---|---|---|---|
| 5,223,844 A | * | 6/1993 | Mansell et al. | 342/357.07 |
| 5,311,197 A | * | 5/1994 | Sorden et al. | 342/457 |
| 5,335,264 A | * | 8/1994 | Namekawa | 455/404 |
| 5,682,133 A | * | 10/1997 | Johnson et al. | 340/426 |
| 5,845,000 A | * | 12/1998 | Breed et al. | 382/100 |
| 5,890,061 A | * | 3/1999 | Timm et al. | 455/404 |
| 5,917,405 A | * | 6/1999 | Joao | 340/426 |
| 5,953,650 A | * | 9/1999 | Villevieille | 455/404 |
| 6,233,506 B1 | * | 5/2001 | Obradovich et al. | 701/1 |
| 6,405,033 B1 | * | 6/2002 | Kennedy et al. | 455/414 |

FOREIGN PATENT DOCUMENTS

WO    WO-9316452    * 9/1993    .......... G08G/1/123

* cited by examiner

*Primary Examiner*—William Trost
*Assistant Examiner*—Stephen M. D'Agosta
(74) *Attorney, Agent, or Firm*—Oblon, Spivak, McClelland, Maier & Neustadt, P.C.

(57) ABSTRACT

A device and method for emergency calling of an assistance center by a vehicle provided with an on-board system that includes a location module for estimation and recording of the location of the vehicle and a sensor for estimation of the number of passengers in the vehicle. The last location and the estimated number of passengers are memorized in a memory of a central unit. The on-board system includes a second sensor interconnected with the central unit and adapted to detect the occurrence of an accident and an on-board communication module that is also interconnected with that central unit. When an accident is detected, the central unit is adapted to communicate to the assistance center a message that includes both the last location of the vehicle and the number of passengers on-board.

20 Claims, 1 Drawing Sheet

DEVICE AND METHOD FOR EMERGENCY CALL

BACKGROUND OF THE INVENTION

1. Field of the Invention

The invention relates to a device and a process for emergency calling of an assistance center by a vehicle, at the time of an accident, for example, communicating information on identification of the vehicle and on its location on the road system. The advantage of such a device resides in the fact that the assistance center will be able to send aid appropriate for the damaged vehicle, so as to increase the effectiveness of the help.

2. Discussion of the Background

At the present time there are devices for alerting an assistance center by sending an alarm signal through manual triggering with the aid of a button or by automatic triggering, controlled by an impact sensor built into the vehicle. The vehicle in distress sends an alarm signal which is picked up by continuously monitoring receivers and which then is processed by the assistance center to deduce the identification of the vehicle and its location. Such a device is described, for example, in patent application FR 92 12364 in the name of THOMSON C. S. F. BRANCH.

Communication between the vehicle and the assistance generally is established by means of a radiotelephony cellular network on which there are transmitted the data required for the dispatch of aid, such as the position of the vehicle, estimated by a G.P.S. (Global Positioning System) receiver, its speed and the assigned telephone number. To confirm receipt of this alarm message, the assistance center sends tonal signal. In the European patent application EP 0737953 A1 in the name of FORD, if the on-board system in the vehicle does not receive any confirmation signal, it then dials a second telephone number authorizing vocal exchanges, through which the passengers will be able to communicate verbally the necessary information, displayed on an alphanumeric screen.

The principal drawback of these current devices lies in the fact that they necessarily imply that the passengers in the damaged vehicle are in a position to communicate additional information verbally following the accident. The only data sent by the vehicle are a caller identifier, for example the telephone number thereof, the location of the vehicle by its GPS coordinates, and possibly its course and its speed at the time of the accident.

In the event that this information is insufficient and the passengers are unable to supplement it, the assistance center does not optimize the aid which it can send.

SUMMARY OF THE INVENTION

The purpose of the invention is to mitigate these drawbacks by proposing a device for emergency calling sending complete information concerning the circumstances of the impact and the number of passengers, as well as possibly a sound recording in the preceding minutes.

For that purpose, a first subject of the invention is a device for emergency calling of an assistance center by a vehicle, said vehicle being equipped with an on-board system which comprises:

a central electronic control unit;
a GPS locating module;
a mobile communication module;
means for manual control;
electronic sensors for functioning of components of the vehicle;

and the assistance center comprising a computer connected to the telephone network by a modem, characterized in that the on-board system further comprises:

a vocal interface between the communication module and the user, containing a microphone, a loud-speaker and an electronic monitoring circuit, in the form of a "hands free" kit;
a memory dedicated to the recording of audio signals;
sensors for opening of doors of the vehicle;
an impact sensor controlling the cut-off of the fuel intake into the engine of the vehicle;
means for stand-by electrical supply.

A second subject of the invention is a process for emergency calling implemented by a device such as previously claimed, characterized according to a first mode of operation in that it comprises the following stages, executed:

under normal running conditions of the vehicle, by the central unit of the on-board system:
verification of functioning of the mobile communication module,
ongoing saving, over a set minimal duration, of data concerning the running behavior, consisting of the last location points, the speed and the direction of the vehicle,
evaluation of the signals emitted by the sensors and detection of an impact,
estimating and memorizing of the number of passengers,
ongoing recording, over a set minimal duration d, of the acoustical signal picked up by the microphone of the module, in the event of manual or automatic triggering of the emergency calling procedure:
periodic transmission, through the central unit of the on-board system to the assistance center, of a brief message of memorized data concerning the running behavior of the vehicle,
automatic calling of the telephone number of the assistance center for establishment of a vocal communication between the passengers of the vehicle and the center,
transmission of essential memorized data concerning the running behavior of the vehicle, consisting in particular of the last location point and the type of triggering of the calling procedure, manual or automatic, through "Dual Tone Multiple Frequency"—D.T.M.F.—coding, on the voice channel so established,
confirmation of the correct receipt of the data by the assistance center, interrupting the periodic transmission of the data.

According to a second mode of functioning, the process is characterized by the following stages, executed:

under normal running conditions of the vehicle, by the central unit of the on-board system:
verification of the functioning of the mobile communication module,
ongoing saving, over a set minimal duration, of data concerning the running behavior consisting of the last location points, the speed and the direction of the vehicle,
evaluation of the signals emitted by the sensors and detection of an impact, estimating and memorizing of the number of passengers, ongoing recording, over a set minimal duration d, of the acoustical signal picked up by the microphone of the module, in the event of manual or automatic triggering of the emergency calling procedure:

transmission, by the central unit of the on-board system to the assistance center, of a brief message of memorized data concerning the running behavior of the vehicle, automatic calling of the telephone number of the assistance center for the establishment of a vocal communication between the passengers of the vehicle and the center, transmission of essential memorized data concerning the running behavior of the vehicle, consisting in particular of the last location point and the type of triggering of the calling procedure, manual or automatic, by "Dual Tone Multiple Frequency"—D.T.M.F.—coding, on the voice channel so established, transmission by the assistance center, in the event of defective receipt of the data, of a command signal for retransmission of data by the on-board system.

BRIEF DESCRIPTION OF THE DRAWINGS

Other characteristics and advantages of the invention will become apparent upon reading of the following description, illustrated by the sole FIGURE, which is a synoptic diagram of the device.

As the synoptic diagram of the figure shows, the alarm device comprises essentially two parts: the on-board system 1 in the motor vehicle on the one hand, and a station processing the calls at an assistance center 2, on the other.

DESCRIPTION OF THE PREFERRED EMBODIMENTS

Figure 1:
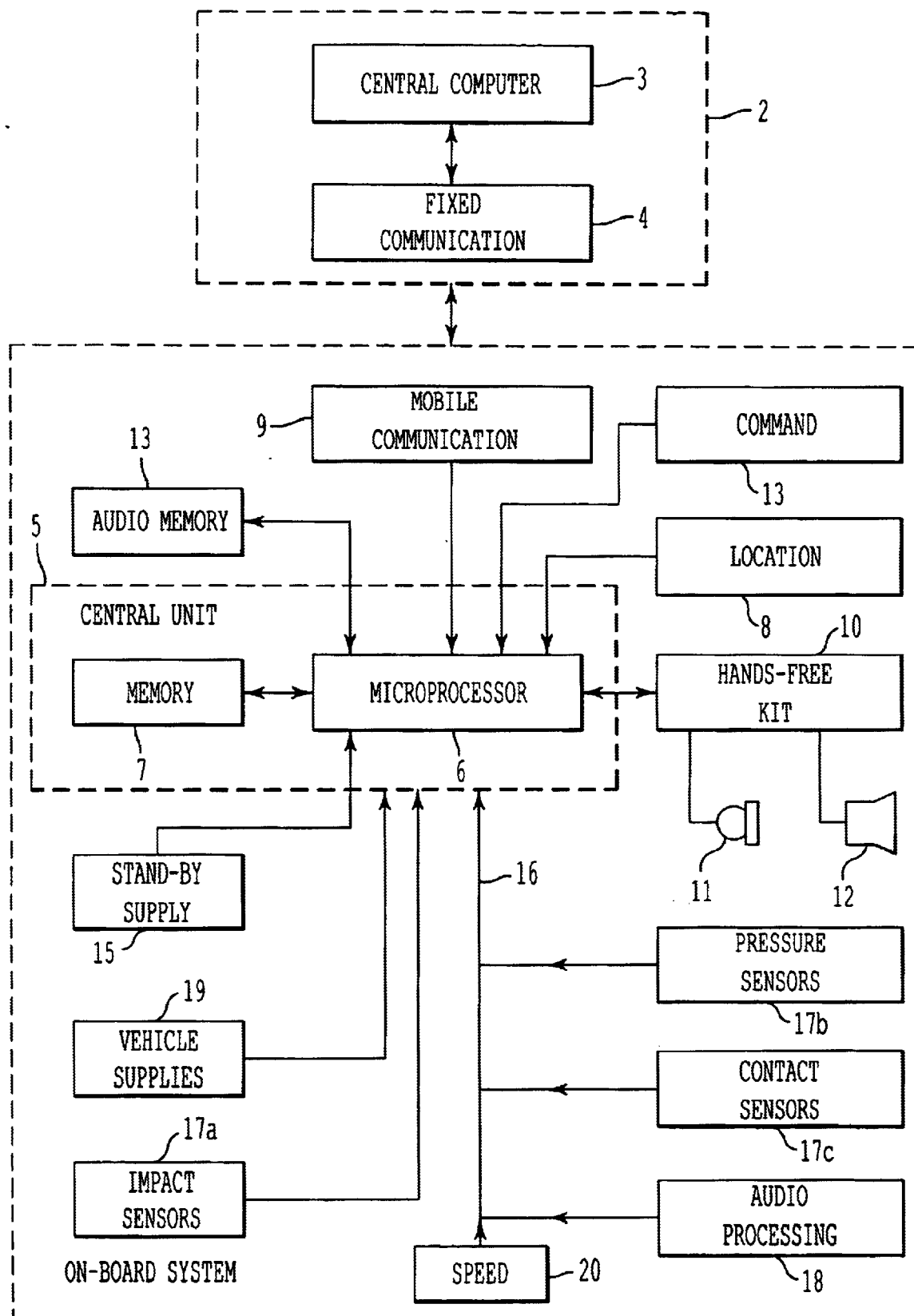

This latter part is composed principally of a computer 3, connected to the telephone network by means of a modem 4.

The on-board system 1 comprises:

a central unit 5, composed of a microprocessor 6 and a memory 7, in which there are stored in particular the telephone numbers of the assistance center;

a location module 8, composed in particular of a GPS receiver and its GPS antenna, which may be supplemented by other means such as a gyrometer;

a mobile communication module 9, composed of a radiotelephone suitable for the cellular network, of the GSM type, for example, and which may be portable, with an outside antenna, if need be;

a vocal interface 10 between the mobile communication module and the user, comprising a microphone 11, a loud-speaker 12 and an electronic monitoring circuit, in the form of a "hands-free" kit, making it possible for the microphone to pick up sounds without the telephone set being held by a passenger;

a memory 13 dedicated to the recording of audio signals, such as an EEPROM audio analog memory, which may be either integrated physically into the radiotelephone, or in an electronic box dedicated to the emergency calling function;

a control box 14, with one or several buttons intended for manual triggering of an emergency calling signal;

a stand-by electric supply 15, ensuring supplying of the elements of the on-board system in the event that the feed 19 for the vehicle might be inoperative because of a failing main battery;

a connection to a vehicle speed sensor 20;

an interconnection 16 between the central unit 5 and various sensors and elements of the vehicle consisting, for example, of an electronic communication bus.

This intercommunication makes possible the monitoring, by microprocessor 6, of the signals emitted by the impact sensors $17_a$, the pressure sensors $17_b$ built into the seats, or the sensors for opening of doors $17_c$, or else by a central electronic unit 18 for processing of audio signals in the event that the number of passengers is calculated from the acoustical signal detected in the passenger compartment.

The emergency calling process implemented by the device described above comprises the following stages:

under normal running conditions of the vehicle, first of all, upon start-up of the vehicle, the central unit 5 verifies the proper functioning of the device as a whole. If the mobile communication module 9 is a portable radiotelephone, the central unit 5 monitors that it is present and put into service.

In the case of a radiotelephone requiring the introduction of a code to authorize the establishment of a communication, such as a PIN—Personal Identity Number—code, provided for in the GSM—Global System for Mobile Communication—radiotelephones, the central unit 5 makes a request therefor to the user, through a sound or visual signal. It possibly may memorize the code discerned by the operator in order to enter it automatically at the time of the next start-up of the vehicle.

The central unit reads in an ongoing manner the signals received from the impact sensors $17_a$ to detect the occurrence of an accident. It simultaneously memorizes the last location points of the vehicle, dated and transmitted by the location module, as well as the speed and direction of the vehicle, in its local memory 7.

According to a variant, the speed information deriving from the sensor 20 of the vehicle makes it possible for the central unit 5 to calculate the distance covered since the last GPS location point. This piece of information is important when the location is provided by a GPS receiver alone, to indicate the possible absence of a point.

To make the aid to be sent to the vehicle as appropriate as possible, in the event of a problem, the central unit also saves in its local memory 7 the number of passengers present in the vehicle, which is a piece of information obtained from the signals emitted either by pressure sensors installed in each seat, or from openings of the doors, or else from acoustical signals picked up by the microphone.

According to one characteristic of the invention, estimating of the number of passengers from the opening of doors is easily achievable by using, for example, elementary contact sensors $17_c$, now mounted in each door in sight of the roof-light control. By taking into account the number of openings detected per door and the duration of these openings, the number of passengers is estimated, knowing the characteristics of the vehicle; that is, its number of seats, its number of doors . . . , which are stored by the assistance center.

According to another characteristic of the invention, in the case of a vehicle equipped with a sound signal processing unit 18, applied to voice recognition, for example, this unit 18 evaluates, at the time of detection of a vocal signal, an elementary identifier of the voice detected, based on its frequency spectrum and determined with the aid of known techniques for identification of the speaker. The processing unit 18 then memorizes this identifier if it is very different from those previously stored. The number of identifiers represents the number of passengers who expressed themselves verbally in the vehicle.

Another characteristic of the invention provides for the ongoing recording of the sound signal, picked up by the microphone 11 of the "hands free" telephony kit 10, on the audio memory 13 of the on-board system 1 in the vehicle, for a predetermined minimal duration d.

According to one embodiment, the sound signal picked up by the microphone is memorized on two separate zones of the audio memory 13, with dimensions corresponding to the given saving duration d. When one of the two zones is filled, the central unit swings the recording onto the second zone. The complete sound signal will be obtained by juxtaposing the two memorized zones successively in the chronological order of recording.

In the event of a problem, the emergency calling procedure is triggered either manually by one of the passengers in the vehicle, or automatically following the detection of an impact.

In the first case, the passenger or passengers in the vehicle is/are capable of bringing about the emergency calling procedure manually, with the aid of the control box 14. The central unit 5 of the on-board system 1 then determines whether a GPS location point is available and adds it to the travel record already memorized. Then it transmits to the assistance center 2 a message of brief duration, of the S.M.S.—Short Message Service—type, for example, deriving from the G.S.M. standard—independently of the voice channel, and containing memorized data on the running behavior of the vehicle. This message consists of a variable indicating the type of triggering, manual or automatic, the last location positions of the vehicle, the speed and the course corresponding to the last GPS location point for which the speed is sufficient to obtain a proper precision, the distance traversed since this last point, the number of passengers, the intensity of the impact deriving from acceleration sensors built into the vehicle in the so-called "airbag" inflatable cushion safety device in particular, and possibly the identification of the radiotelephone subscriber or the vehicle.

In order to better understand the causes and the severity of an accident and thus to better structure the means of help to be implemented following an emergency call, the invention further provides that the central unit 5 of the on-board system 1 in the vehicle retrieves certain information and stores it in the local memory 7, to then be transmitted to the assistance center. This additional information is, for example, the functioning of windshield wipers, indicating the presence of rain, that of the lighting systems such as the fog headlights, the low beams, the temperature of the roadway when this information is available, or even the pressure of the tires when they are equipped with pressure sensors.

A particularly important piece of information may be provided to the assistance center when the calling vehicle is equipped with a proximity detector: it is the possible presence of another vehicle in the vicinity thereof, as well as its distance and its speed.

At the time of detection of an impact, the updating of the local memory 7 is interrupted and the previously stored data are added to the S.M.S. message transmitted to the assistance center.

Then the central unit 5 automatically dials the telephone number of the assistance center, which is stored in its memory 7 of system 1, for a vocal communication. To ensure the time of receipt, by the assistance center, of information essential for the dispatching of aid to the damaged vehicle, such as its position, for example, and the manual or automatic type of triggering of the procedure, the latter are transmitted, in superposition, on the voice channel, by D.T.M.F.—Dual Tone Multiple Frequency—coding, which is an analog signaling system defined in U.I.T. recommendation Q23, which makes possible in particular the coding of telephone keys. The voice channel then is available for a vocal communication between the passengers and the assistance center. Simultaneously, the caller is identified by his/her telephone number, generally transmitted numerically at the time of the call, in particular at the time of communications with the aid of the G.S.M. cellular network. The other information relating to the driver, such as his/her identity, his/her blood group, or that concerning the vehicle, is delivered, thanks to knowledge of the telephone number, by a data base set up based on all the subscribers to the assistance center service.

In the second case of emergency call, the procedure is triggered automatically when the central unit detects an impact from a signal emitted by a sensor. If the passengers present in the damaged vehicle are not in a position to respond verbally to the telephone call from the assistance center, in order to communicate the information required for appropriate aid, then the call center may request restoration of the sound recording mentioned previously, by sending a command signal in the form of a brief S.M.S. message the content of which is known to the on-board system. It also may transmit a tonal signal, a sinusoid for example, or more advantageously a coded D.T.M.F. signal, composed of 12 codes corresponding to the 12 keys of the telephone keyboard of the vehicle.

The on-board system having received one of these types of command restores on the voice channel from the telephone communication established following the detection of an impact, the sound signal stored in the two memory zones, in the chronological order of recording.

The invention provides for two modes of functioning, regardless of the type of triggering of the calling procedure. According to a first mode, the on-board system periodically transmits the brief message and the coded DTMF data in accordance with a period equal to 30 seconds for example, until the assistance center confirms proper receipt thereof through a confirmation signal.

According to a second mode of functioning, the transmission of the brief message and the coded data is effected only once, except if the assistance center requests, through a command signal, the retransmission thereof because of faulty reception, this command signal being different from the command signal for transmission of the sound signal.

According to a particularly advantageous characteristic, the assistance center uses the call notice to command the sending of the sound recording or the retransmission of data from the vehicle. For that purpose, the center being in vocal communication with the passengers in the vehicle, from the telephone number dialed automatically by the on-board system at the time of the impact, it in turn dials the number of the on-board radiotelephone in the vehicle. This receives a call notice, verifies that the number of the caller corresponds to a memorized assistance center number, and refuses this call in order to cancel the cost of the operation for the center 2. The system 1 interprets this second call as a command signal and then transmits the salient data relating to the vehicle and the accident, as well as the sound recording, if need be.

Concerning the detection of a vehicle impact by the central unit of the on-board system 1 bringing about the automatic triggering of the emergency call procedure, it may be accomplished from a sensor in inertia triggering the "airbag" device or the safety-belt pretensioners, provided that the vehicle is equipped with a bus for communication between the sensors and the central unit.

According to an alternative embodiment, a first terminal of a mechanical contactor may be attached to the safety-belt support positioned between the seats and the other terminal on the fastening buckle so that the triggering of the pretensioner, following an impact brings about contact of the two terminals and the occurrence of an electric signal transmitted to the central unit 5 of the system 1.

According to one characteristic of the invention, the detection of the impact by the central unit 5 is effected from a sensor in inertia, reacting according to three axes, used in a safety device which cuts off the intake of fuel into the engine, in the event of an impact, regardless of the direction thereof and even in the event of overturning of the vehicle. This device includes several outlets which may be used without danger.

Moreover, in the case of an installation of the emergency calling device subsequent to initial assembly, faulty handling may cause triggering of the safety device without a distressing consequence, since the switch controlling the intake of gasoline can be repositioned manually, contrary to the sensor for triggering of the "airbag."

According to another characteristic, the invention provides for the use of the signal received through the microphone 11 of the "hands-free" telephony module 10 to identify the blowing up of an "airbag" in the vehicle or the triggering of a safety-belt pretensioner, following an impact. As a matter of fact, the bang caused by the triggering of an airbag or of a pretensioner generates a loud noise, of a sound level far in excess of the standard noises perceptible in a passenger compartment of a running vehicle. For that purpose, the central unit 5 continuously compares the level of the electric signal generated through the microphone to a reference threshold value. If this threshold is exceeded for a given duration, the central unit 5 automatically triggers the emergency calling procedure.

At the time of activation of the on-board system, during which certain data, such as the telephone numbers of the assistance center, are to be entered into a system memory, an advantageous solution consists in storing these data on the S.I.M. card, with which every holder of a subscription to a G.S.M. cellular radiotelephony network is provided.

Upon the first use of the on-board system, the central unit 5 reads the memorized data on the S.I.M. card and stores them in its memory 7. It also can read the memorized data on this card upon each use of the on-board system which, in particular, makes subsequent revisions possible.

What is claimed is:

1. A device for emergency calling of an assistance center by a vehicle, the device comprising:
   an on-board system in said vehicle including:
   (a) a central unit including a microprocessor and a memory;
   (b) a location module configured to estimate the location of said vehicle, said location module being interconnected with said central unit and a last location of said vehicle being memorized in said central unit memory;
   (c) a first sensor including a vocal interface, interconnected with said central unit, and configured to estimate the number of passengers in said vehicle on the basis of audio signals detected in a passenger compartment of said vehicle, said estimate of said number of passengers being memorized in said central unit memory;
   (d) a second sensor interconnected with said central unit and configured to detect the occurrence of an accident; and
   (e) a communication module interconnected with said central unit and configured to communicate with said assistance center;
   wherein, when an accident is detected, said central unit is configured to communicate to said assistance center a message that includes both said last location of said vehicle and said number of passengers.

2. A device according to claim 1, wherein said first sensor further includes an electronic memory configured to make a recording of audio signals detected in said passenger compartment.

3. A device according to claim 2, wherein, in the event that the passengers do not communicate verbally with said assistance center at the time of said emergency call, said on-board system in response to a command signal retrieves the recording of audio signals from the electronic memory.

4. A device according to claim 1, wherein said first sensor further includes a voice recognition signal processing unit, said signal processing unit configured to evaluate, at the time of detection of a voice signal, an elementary identifier of the voice detected.

5. A device according to claim 4, wherein the number of said identifiers represents the number of passengers who expressed themselves verbally in said vehicle.

6. A device according to claim 1, wherein said vocal interface includes a hands-free-kit.

7. A device according to claim 1, wherein said first sensor includes door sensors configured to detect a door opening and the occurrence of a door opening is used by said first sensor in said estimate of said number of passengers.

8. A device according to claim 7, wherein the duration of a door opening is used in said estimate of said number of passengers.

9. A device according to claim 1, wherein said second sensor includes an impact sensor.

10. A device according to claim 9, wherein said impact sensor includes an inertia sensor.

11. A device according to claim 10, wherein said inertia sensor is configured to control the cutting off of intake of fuel into an engine of said vehicle.

12. A device according to claim 9, wherein said impact sensor includes an acceleration sensor and said message indicates to said assistance center the intensity of an impact derived therefrom.

13. A device according to claim 9, wherein said impact sensor is configured to detect an accident in the event that a seat belt pretensioner is triggered.

14. A device according to claim 1 further including a manual control means interconnected with said central unit for manual triggering of said message, said message including a variable that indicates whether the triggering was manual or automatic.

15. A device according to claim 1, wherein said message is transmitted in the form of a Short-Message-Service (SMS) message.

16. A process for emergency calling from a vehicle to a call center, including the steps of:
   (a) estimating a location of said vehicle and memorizing in an on-board memory a last location of said vehicle;
   (b) estimating a number of passengers in said vehicle using a vocal interface on-board said vehicle and memorizing in the on-board memory said estimated number;

(c) detecting the occurrence of an accident; and (d) communicating to said assistance center, on the detection of said accident, a message including both said last location and said number of passengers.

17. A method according to claim 16, further including the steps of:

calling automatically or manually said assistance center to establish a vocal connection between said vehicle and said assistance center; and including in said message a variable that indicates the type of triggering, manual or automatic.

18. A method according to claim 17, further including the step of identifying said vehicle or its driver to said assistance center by a telephone number of a mobile communication module that is on-board said vehicle and is used to establish said vocal connection.

19. A method according to claim 16, further including the steps of:

recording in a memory audio signals detected in a passenger compartment of said vehicle; and transmitting from said assistance center, in the event that the passengers do not communicate verbally with said assistance center at the time of establishing of said emergency call, a command signal to the on-board system to retrieve the recording of audio signals.

20. A method according to claim 16, further including the step of estimating said number of passengers using door sensors of said vehicle.

* * * * *